(12) United States Patent
Frohwitter et al.

(10) Patent No.: US 12,073,259 B2
(45) Date of Patent: Aug. 27, 2024

(54) APPARATUS AND METHOD FOR EFFICIENT PARALLEL COMPUTATION

(71) Applicant: ParTec AG, Munich (DE)

(72) Inventors: Bernhard Frohwitter, Munich (DE); Thomas Lippert, Aschaffenburg (DE)

(73) Assignee: PARTEC AG, Munich (DE)

(*) Notice: Subject to any disclaimer, the term of this patent is extended or adjusted under 35 U.S.C. 154(b) by 734 days.

(21) Appl. No.: 17/048,457

(22) PCT Filed: May 15, 2019

(86) PCT No.: PCT/EP2019/062483
§ 371 (c)(1),
(2) Date: Oct. 16, 2020

(87) PCT Pub. No.: WO2019/219747
PCT Pub. Date: Nov. 21, 2019

(65) Prior Publication Data
US 2021/0157656 A1    May 27, 2021

(30) Foreign Application Priority Data
May 15, 2018  (EP) ..................... 18172497

(51) Int. Cl.
*G06F 9/50* (2006.01)
*G06F 1/329* (2019.01)
*G06F 9/48* (2006.01)

(52) U.S. Cl.
CPC ............ *G06F 9/5094* (2013.01); *G06F 1/329* (2013.01); *G06F 9/4893* (2013.01); *G06F 9/5027* (2013.01)

(58) Field of Classification Search
CPC ...... G06F 9/5094; G06F 1/329; G06F 9/4893; G06F 9/5027; G06F 1/324; G06F 1/3296; Y02D 10/00
See application file for complete search history.

(56) References Cited

U.S. PATENT DOCUMENTS

2005/0166073 A1   7/2005  Lee
2011/0167229 A1*  7/2011  Szalay .................... G06F 3/068
                                          711/E12.001

(Continued)

FOREIGN PATENT DOCUMENTS

CN       107465500 A        12/2017
JP       2002099433 A        4/2002
WO    WO-2012049247 A1      4/2012

OTHER PUBLICATIONS

International Search Report and Written Opinion for International Application No. PCT/EP2019/062483, dated Jul. 8, 2019.

*Primary Examiner* — Zhipeng Wang
(74) *Attorney, Agent, or Firm* — MARSHALL, GERSTEIN & BORUN LLP; Michael P. Furmanek

(57) ABSTRACT

The present invention provides a computing unit for operating in a parallel computing system, the computing unit comprising a plurality of processing elements and an interface for connecting the computing unit to other components of the computing system wherein each processing element has a nominal maximum processing rate NPR and each processing element includes a respective memory unit such that data can be transferred from the memory unit at a predetermined maximum data rate MBW and the interface provides a maximum data transfer rate CBW, wherein in order to provide a predetermined peak calculation performance for the computing unit PP obtainable by a number n processing elements operating at the nominal maximum processing rate such that PP=n×NPR operations per second, the computing unit includes an integer multiple f times n processing elements wherein f is greater than one and each processing element is limited to operate at a processing rate of NPR/f.

14 Claims, 1 Drawing Sheet

(56) References Cited

U.S. PATENT DOCUMENTS

| | | | |
|---|---|---|---|
| 2012/0059960 A1* | 3/2012 | Cheruel | H04L 47/25 710/107 |
| 2015/0095620 A1* | 4/2015 | Ananthakrishnan | G06F 9/30083 712/220 |
| 2016/0196121 A1 | 7/2016 | Baskaran et al. | |
| 2017/0212581 A1 | 7/2017 | Park et al. | |

* cited by examiner

APPARATUS AND METHOD FOR EFFICIENT PARALLEL COMPUTATION

CROSS-REFERENCE TO RELATED APPLICATIONS

This is the United States national phase of International Patent Application No. PCT/EP2019/062483, filed May 15, 2019, which claims priority to EP 18172497.2 filed May 15, 2018, the entire contents of each of which are hereby incorporated by reference herein.

FIELD OF THE DISCLOSURE

The present invention relates to parallel processing systems and in particular parallel processing systems which have an improved efficiency in terms of performance/energy consumption.

BACKGROUND

In typical parallel processing system, multiple computation nodes each comprising one or more processing elements are connected by a high-speed network. The processing elements of the computation node each have internal memory. The processing elements are connected within their computation node. This on-computation node connectivity might be realized with the technology of the high speed network, a separate on-computation node high speed network or a common memory (as for example in Symmetric-Multiprocessing, SMP, systems). Such an arrangement is illustrated in FIG. 1.

FIG. 1 shows an arrangement of multiple computation nodes CN, with each computation node including a plurality of processing elements, PE, each having a respective memory, MEM. The computation nodes are connected to each other via a high speed network, HSN, with each computation node including a network interface controller, NIC, for connecting to the high speed network. The individual processing elements are connected together and also connect to the network interface controller.

A processing element has a peak performance, PP, which is the upper limit for the number of (floating point) operations the processing element can execute per second, measured as floating point operations per second or in short "flops" (while floating point operations are referred to, the operations may equally be integer operations). The peak performance of a computation node, PPCN, is the sum of the peak performances of its processing elements. A given application A, in general, can realize only a fraction $\eta_A$ of the peak performance, with $0<\eta<1$, $\eta$ being called sustained efficiency. The reason for this is that the data transfer rate, i.e, the memory bandwidth (MBW) between the memory of the processing element to its compute registers is finite and thus will decrease the exploitation of the peak performance to $\eta_A$ for a given application. A similar argument can be made for the input/output data transfer rate, i.e. the communication bandwidth (CBW) of a processing element to another processing element off-computation node, potentially further decreasing the exploitation of the peak performance.

As a rule of thumb, practitioners of high performance computing consider a ratio R=MBW/PP of 1 byte/flop a necessary requirement to achieve $\eta$ close to 1 for a majority of data-intensive applications. Depending on the data rate required by a given application A to exhaust the peak performance, the actual memory bandwidth of the processing element determines the $\eta_A$ that can be achieved for the application A.

Current high-end CPUs suffer from an R as low as 0.05 to 0.1 byte/flop, a number that was continuously decreasing in the last decade with the number of compute cores of a processing element increasing. Current high-end GPUs achieve an R below 0.15 byte/flop only, mainly designed to meet the data requirements of graphics applications and, just recently, deep learning applications. As a detrimental consequence, the most data intensive applications will achieve an $\eta_A$ below 5 to 10% on current CPUs and around 15% on current GPUs a priori, independent of any further decrease by the algorithm being executed or the parallelism in terms of processing elements required. The more data intensive the application is the lower the efficiency $\eta_A$ becomes for a given R of the processing element.

This problem has been identified by others, as for example described in an article by Al Wegner published in Electronic Design in 2011 entitled "The Memory Wall is Ending Multicore Scaling", available at http://www.electronicdesign.com/analog/memory-wall-ending-multicore-scaling.

A similar consideration can be made for the communication bandwidth of a given processing element describing the data transfer rate to another processing element on-computation node and off-computation node. Of importance here is the impact of the communication bandwidth on the scalability of the code.

As far as the communication bandwidth on-computation node is concerned, one can distinguish between three cases, computation nodes, where the processing elements are connected via the high speed network, computation nodes where the processing elements are connected to a separate network on the computation node that is again connected to the high speed network, and computation nodes that exchange data on-computation node through a common memory.

Concerning communication off-computation node, the practitioners of high performance computing consider a ratio r=CBW/MBW>0.1 to 0.2 as appropriate to achieve scalability for a multitude of applications. It is evident that the closer the communication bandwidth is to the memory bandwidth, the better are the conditions for scalability.

The theoretically possible communication bandwidth is determined by the number of serial lanes available from the processing element to the high speed network (this holds for both CPUs and GPUs). This number is limited by the serializer-deserializer implementation that is constrained on current chip technology.

It is important that the network interface controller, NIC, of the computation node is dimensioned appropriately to sustain the data stream from and to the processing elements of the computation node.

US 2005/0166073 A1 describes the use of a variable operating frequency of system processors in order to maximize a system memory bandwidth.

US 2011/0167229 A1 describes a computing system comprising multiple computing devices each connected to a storage device, such as a hard drive, as opposed to a memory. The aim of the system is to match a data rate of retrieving stored data and a processing speed. The suggestion in this document is to use storage units with a higher data transfer rate, i.e. solid state drive in place of or in addition to a hard disk drive, combined with particular low power processors which operate at a lower clock rate.

US 2015/0095620 describes a technique for estimating the scalability of a workload in a computing system. The system has a single multi-core processor.

GENERAL DESCRIPTION

The present invention provides a computing unit for operating in a parallel computing system, the computing unit comprising a plurality of processing elements and an interface for connecting the computing unit to other components of the computing system wherein each processing element has a nominal maximum processing rate NPR and each processing element includes a respective memory unit such that data can be transferred from the memory unit at a predetermined maximum data rate MBW and the interface provides a maximum data transfer rate CBW, wherein in order to provide a predetermined peak calculation performance for the computing unit PP obtainable by a number n processing elements operating at the nominal maximum processing rate such that PP=n×NPR operations per second, the computing unit includes an integer multiple f times n processing elements wherein f is greater than one and each processing element is limited to operate at a processing rate of NPR/f.

In a further aspect, the invention provides a method of operating a computing unit comprising a multicore processor and a plurality of graphics processing units, GPUs, each GPU having a nominal peak performance of PPG operations per second, the method comprising operating the GPUs at a fraction 1/f of their nominal peak performance rate, wherein the computing unit provides a predetermined peak calculation performance of PP operations per second and the computing unit has n times f GPUs such that PP is equal to n times PPG.

The present invention relates to the fact that a reduction of the clock frequency v of a processing element by a factor f can reduce the energy consumption of the processing element by a factor f or more. This process is called "underclocking".

The following approximate formula holds for the power consumption of a device of a processing element, $P \propto CV^2v$, with C being the capacitance, V the voltage and P the power consumption. This means, P scales linearly with v and quadratically with V.

Concerning the clock frequency of GPUs as an example, in recent years, a large number of articles on power modelling have been published, which, among other things, strive to allocate the power consumption to individual parts of the processing element. With the latest NVIDIA GPUs, one can change the frequency of the streaming multiprocessors (SMs). This is increasingly designed dynamically and autonomously controlled by the hardware in order to make optimum use of the available power budget. As far as the literature tells, the frequency of the memory subsystem cannot be changed and is autonomously clocked in the current generation. This makes it possible for applications whose performance is limited by memory bandwidth to improve the energy balance by reducing the frequency of the SMs somewhat. One can expect an effect of about 10% in this manner.

The performance of an underclocked machine is often better than expected. With normal desktop use, full processing element performance is rarely required. Even when the system is busy, a lot of time is usually spent waiting for data from memory or other devices.

This fact allows, in principle, the substitution a processing element mounted on a computation node, operating at the frequency v, by a number of f processing elements operating at the frequency v/f, without changing the accumulated compute capability PPCN of the computation node. In addition, the energy consumption of the computation node is maintained or potentially decreased. In practice one would choose f=2 or f=3.

A key aspect of the invention is that for processing elements like modern CPUs and GPUs, the compute frequency f can be decreased without, at the same time, decreasing the memory bandwidth of the processing element. As a consequence, the ratio R is increased by a factor f under this modification. It is remarked that it is not possible to increase the operating frequency of the compute cores without adapting the memory speed.

Secondly, increasing the number of processing elements of a computation node by a factor f increases the total number of available serial lanes on the computation node by a factor f. Therefore, the ratio r for input/output operations off-computation node is improved by a factor f as well.

These improvements increase the concurrency per computation node by a factor f. This requires tuning of the algorithmic approaches for the diverse highly scalable applications but this in principle poses no problems.

While the energy consumption is expected to stay constant, the increased number of processing elements might increase the investment costs, at first sight. However, a large amount of these costs would be due to the memory, which can be decreased for each processing element by a factor of f, while holding the total amount of memory per computation node constant. Moreover, using high-end processing elements at lower frequency might allow to exploit the much less costly sector of the yield that cannot operate at peak frequency.

As a second measure, a reduction of the operating voltage, V, of the processing element can be carried out and will lead to a further reduction of the energy consumption. The dependency on the voltage can be dramatic as power consumption scales quadratically with the voltage. This "undervolting" can be used in addition to underclocking or separately and is another element of the strategy of this invention to improve the energy consumption of the compute section of the processing element.

This invention provides an apparatus that increases the efficiency of parallel processing systems in terms of performance and energy consumption. Technical modifications are introduced that reduce the operating frequency of the processing elements and increase the number of processing elements accordingly to achieve the same peak performance of the entire system at increased application performance. These modifications affect two system parameters that impact the overall efficiency; the memory to register data bandwidth divided by the peak performance of the processing nodes, and the data bandwidth of the processing nodes into the high-speed network of the parallel system divided by the peak performance of the processing nodes. This allows the parallelism of the nodes to be increased with constant or even lower energy consumption of the node. In this manner, the system can be tuned to an optimum of the application performance. The optimum can be selected for any desired measure, e.g. the average application performance of a certain application portfolio or the optimum performance for a certain application. The overall investment costs are also expected to remain similar, as the processing elements used will operate at a lower operating frequency of the compute cores of their processing units while maintaining memory and input/output performance.

The invention presented allows to choose the factor f, which determines the reduction of the processing element frequency and the corresponding increase of the number of processing elements on a computation node, according to selected desired criteria, e.g. the average maximum power for a certain portfolio of applications or the maximum power for a certain application. In fact, both modifications can also be applied independently, depending on the influence of system-critical parameters such as energy consumption and investment costs as well as optimal performance, especially with regard to the interaction of architecture and application with regard to scalability.

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

This invention can be realized with technology existing today. To give an example, it can be a method to speed up application performances in a booster module within a modular supercomputing system that is aiming at peak exascale performance by 2021 as described in WO 2012/049247 A1 and subsequent applications EP 16192430.3 and EP 18152903.3, incorporated herein by reference for all purposes. The goal of the invention is to improve the on-computation node application performance for data-intensive calculations compared to any other architectural design by a factor f, and, in addition, to increase the communication bandwidth in order to keep step with the memory bandwidth for better scaling of many applications with large communication requirements off-computation node.

A realization is given by a set of computation nodes that use Mellanox BlueField (BF) multicore system on chip technology. A BlueField card may comprise multiple graphical processor units, GPUs, a PCIe gen 4 switch and one or more high data rate, HDR, switches. Each BlueField card can be equipped with up to four GPUs. The BF cards comprise two Mellanox host channel adaptors, HCAs, each, thus up to two times HDR performance can be achieved off-computation node.

The AMD Radeon Vega 20 GPU is considered as concrete example for the processing element, expected for general delivery mid of 2018. The Vega-20 GPU can be connected to the PCI-e interface on the BF-computation node by 16 PCIe gen4 lanes. The GPU is expected to be equipped with 32 GigaByte HBM-2 memory, partitioned in four memory banks of 8 GigaByte each. 16 GB of HBM-2 is also a possibility, organized again in four memory banks of 4 GigaByte each. Thus, the memory rate can be the same for both configurations.

With an expected memory bandwidth of 1.28 TeraByte per second and an expected peak performance of 12.5 Teraflop per second (double precision), R=0.1. While this is far off by a factor 10 from the practitioners rule of 1 byte/flop, it is still one of the best ratios R available.

The communication bandwidth is capped by 16 PCIe gen4 lanes, each capable of 2 Gigabyte per lane and direction. With r=64 Gigabyte/1.28 Terabyte=0.05, one certainly will have to fight severe scalability problems for data intensive applications. Any improvement of R and r will help in this respect.

Figure 1:
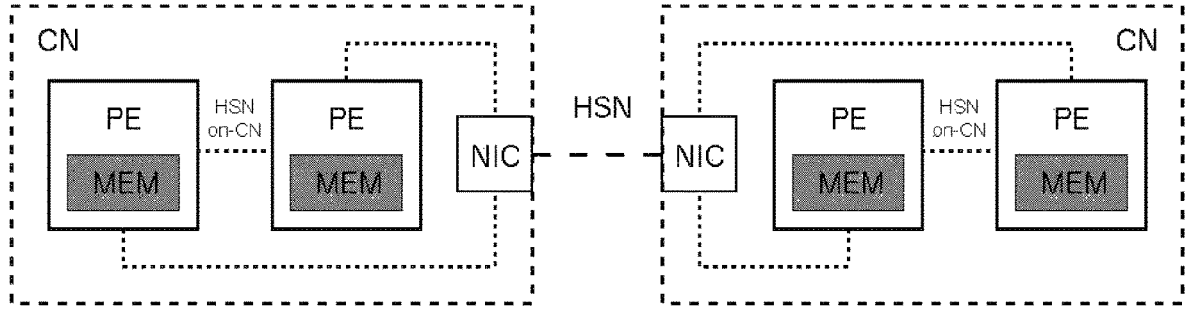
FIG. 1 is a simplified schematic diagram of a conventional parallel processing system.
Figure 2:
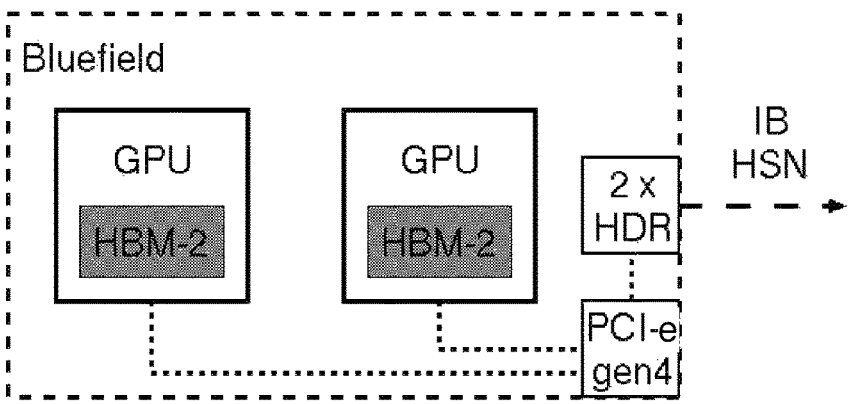
FIG. 2 is a schematic diagram of a computation node including two graphics processing units, GPUs, and a peak performance rate of 25 teraflops.
Figure 3:
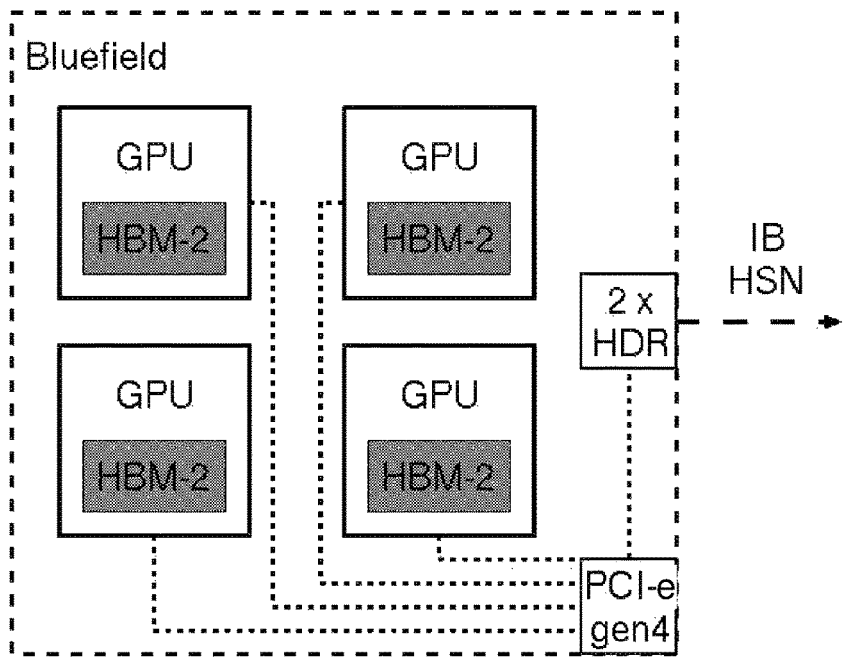
FIG. 3 is a schematic diagram of a computation node including twice as many graphics processing units as the arrangement of FIG. 2 but the same peak performance rate.

This is illustrated schematically by FIGS. 2 and 3.

Let the standard configuration comprise two GPUs as processing elements per BF-CN, operated at the peak frequency v achieving peak performance. The initial configuration is depicted in FIG. 2. As far as the computation node is concerned, the following system parameters are given or are expected:

number of GPUs per computation node: 2
f: 1
Energy Consumption per computation node: 2×150 W=300 W
Memory per computation node: 64 GB
Memory bandwidth per computation node: 2.56 Terabyte per second
Peak Performance per computation node: 25 teraflop per second dp
R per computation node: 0.1
PCIe gen4 lanes per computation node: 32
Communication speed bi-dir per computation node: 128 Gbyte/s (½ for processing element to processing element, ½ to NIC)
2×Mellanox HDR possible: 100 Gbyte per second bi-directional
r per computation node: 0.05
NIC not balanced with communication An improved configuration shown in FIG. 3 comprises four GPUs as processing elements per BF-computation node operated at half the peak frequency v, with f=2, thereby providing the same computation nominal node peak performance value. In this case, the processing element will operate up to one half of the peak performance of the standard configuration. As to the improved computation node, the following system parameters are given or are expected:

# of GPUs per computation node: 4
f: 2
Energy Consumption per computation node expected: 4×75 W=300 W
Memory per computation node: 64 GB©16 GB per GPU or 128 GB©32 GB
Memory bandwidth per computation node: 5.12 Terabyte per second
Peak Performance per computation node: 25 teraflop per second dp
R per computation node: 0.2
PCIe gen4 lanes per computation node: 64
Communication speed bi-dir per computation node: 256 Gbyte/s (½ for processing element to processing element, ½ to NIC)
2×Mellanox HDR possible: 100 Gbyte per second bi-directional
r per computation node: 0.05
NIC balanced to communication To the underclocking can be added an undervolting to further decrease the energy consumption. The stability of the processing element under undervolting might be less affected than in the case of the full voltage applied.

The invention claimed is:

1. A computing unit for operating in a parallel computing system, the computing unit comprising:
   a plurality of processing elements, wherein each of the plurality of processing elements comprises a memory unit and has a nominal maximum processing rate (NPR); and
   an interface for connecting the computing unit to other components of the parallel computing system;
   wherein the computing unit is provided with a predetermined peak calculation performance (PP) that is the product of the NPR and an amount of the plurality of processing elements operating at the NPR,
   wherein the amount of the plurality of processing elements is increased based on an integer (f) greater than one,
   wherein each of the plurality of processing elements included in the amount that was increased is limited to operate at a processing rate equal to NPR/f,
   wherein for each of the plurality of processing elements, data is transferred from the respective memory unit at a predetermined maximum data rate (MBW), and
   wherein f is selected such that a predetermined ratio R=MBW/(NPR/f) is obtained.

2. The computing unit according to claim 1, wherein R is in a range between 0.15 byte/flop and 1 byte/flop.

3. The computing unit according to claim 1, wherein the MBW is within 30% of a processing element to processing element communication rate.

4. The computing unit according to claim 1, wherein the plurality of processing elements are graphics processing units.

5. The computing unit according to claim 1, wherein the plurality of processing elements are connected together by an interface unit, and wherein each of the plurality of processing elements is connected to the interface unit by a plurality S of serial data lanes.

6. The computing unit according to claim 1, wherein the computing unit is a computer card comprising a multi-core processor arranged to control the plurality of processing elements.

7. The computing unit according to claim 1, wherein the plurality of processing elements are GPUs.

8. A method of configuring a computing unit for operating in a parallel computing system, the method comprising:
   configuring a plurality of processing elements, wherein each of the plurality of processing elements comprises a memory unit and has a nominal maximum processing rate (NPR); and
   configuring an interface for connecting the computing unit to other components of the parallel computing system;
   wherein the computing unit is provided with a predetermined peak calculation performance (PP) that is the product of the NPR and an amount of the plurality of processing elements operating at the NPR,
   wherein the amount of the plurality of processing elements is increased based on an integer (f) greater than one, and
   wherein each of the plurality of processing elements included in the amount that was increased is limited to operate at a processing rate equal to NPR/f,
   wherein for each of the plurality of processing elements, data is transferred from the respective memory unit at a predetermined maximum data rate (MBW), and
   wherein f is selected such that a predetermined ratio R=MBW/(NPR/f) is obtained.

9. The method according to claim 8, wherein R is in a range between 0.15 byte/flop and 1 byte/flop.

10. The method according to claim 8, wherein the MBW is within 30% of a processing element to processing element communication rate.

11. The method according to claim 8, wherein the plurality of processing elements are graphics processing units.

12. The method according to claim 8, wherein the plurality of processing elements are connected together by an interface unit, and wherein each of the plurality of processing elements is connected to the interface unit by a plurality S of serial data lanes.

13. The method according to claim 8, wherein the computing unit is a computer card comprising a multi-core processor arranged to control the plurality of processing elements.

14. The method according to claim 8, wherein the plurality of processing elements are GPUs.

* * * * *